(12) United States Patent
Lam et al.

(10) Patent No.: US 9,467,012 B2
(45) Date of Patent: Oct. 11, 2016

(54) ELECTRIC MOTOR

(71) Applicant: Johnson Electric S.A., Murten (CH)

(72) Inventors: Kar Wai Lam, Hong Kong (CN); Cai Yong Zhang, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 131 days.

(21) Appl. No.: 14/485,173

(22) Filed: Sep. 12, 2014

(65) Prior Publication Data
US 2015/0069873 A1 Mar. 12, 2015

(30) Foreign Application Priority Data

Sep. 12, 2013 (CN) .......................... 2013 1 0416203

(51) Int. Cl.
*H02K 21/26* (2006.01)
*H02K 1/18* (2006.01)
*H02K 1/17* (2006.01)
*H02K 5/04* (2006.01)

(52) U.S. Cl.
CPC *H02K 1/18* (2013.01); *H02K 1/17* (2013.01); *H02K 5/04* (2013.01)

(58) Field of Classification Search
USPC .......................... 310/154.03, 154.08, 154.12
See application file for complete search history.

(56) References Cited

U.S. PATENT DOCUMENTS

| | | | |
|---|---|---|---|
| 5,675,204 A | 10/1997 | Kusumoto et al. | |
| 6,075,301 A * | 6/2000 | Shinoda | H02K 1/185 310/154.17 |
| 2004/0104636 A1* | 6/2004 | Ortt | H02K 1/17 310/154.08 |
| 2008/0169719 A1* | 7/2008 | Yu | H02K 1/2786 310/156.08 |
| 2011/0278966 A1* | 11/2011 | Osborne | H02K 1/17 310/44 |

FOREIGN PATENT DOCUMENTS

JP H08205433 8/1996

* cited by examiner

*Primary Examiner* — Hanh Nguyen
(74) *Attorney, Agent, or Firm* — Muncy, Geissler, Olds & Lowe, P.C.

(57) ABSTRACT

A stator includes a housing made of magnetically conductive material, a plurality of magnets fixed to the stator housing; and a magnet holder attached to one end of the housing for fixing the magnets to the stator housing. The magnet holder includes a body and a plurality of locking structures extending from the body. Each magnet is locked between two adjacent locking structures. A plurality of cut-outs is formed in the stator housing, and a plurality of projections is formed on the body of the magnet holder and engaged with the cut-outs. Each locking structure includes a wedge-shaped inner end inwardly abutting against respective magnets to prevent the magnets from moving inwardly.

19 Claims, 12 Drawing Sheets

ELECTRIC MOTOR

CROSS REFERENCE TO RELATED APPLICATIONS

This non-provisional patent application claims priority under 35 U.S.C. §119(a) from Patent Application No. 201310416203.4 filed in The People's Republic of China on Sep. 12, 2013, the entire contents of which are hereby incorporated by reference.

FIELD OF THE INVENTION

This invention relates to electric motors and in particular, to permanent magnet stators of electric motors.

BACKGROUND OF THE INVENTION

An electric motor usually comprises a stator and a rotor rotatable relative to the stator. The stator usually comprises a round stator housing and a plurality of arc magnets installed on the inner surface of the stator housing. The magnets are usually adhered to the stator housing via glue, which is complicated and time-consuming especially when the motor has a lot of magnets. Furthermore, when the motor operates at a high temperature for a long time, the glue is subject to faster aging and the magnets may detach from the stator housing.

SUMMARY OF THE INVENTION

Thus there is a desire for a stator with an improved magnet holder which can solve the above problems.

Accordingly, in one aspect thereof, the present invention provides a stator for an electric motor, comprising: a housing made of magnetically conductive material; a plurality of magnets fixed to the housing; and a magnet holder attached to one end of the housing for fixing the magnets to the housing, the magnet holder comprising a plurality of locking structures, each magnet being locked between two adjacent locking structures.

Preferably, each locking structure has a pair of concave locking surfaces formed on opposite sides thereof, and each magnet has a pair of side surfaces conforming with corresponding locking surfaces of the magnet holder.

Preferably, the magnets are arranged in groups of like polarities to form magnetic poles of the stator.

Preferably, widths of the locking structures located between adjacent magnets with the same polarities are less than widths of the locking structures located between adjacent magnets with opposite polarities.

Preferably, the magnets are elongate plate shaped magnets.

Preferably, each magnet has a pair of opposite major surfaces parallel to each other, the major surfaces being perpendicular to a radial direction of the stator.

Preferably, at least one locating structure is formed between the magnet holder and the housing for locating the magnet holder relative to the housing.

Preferably, the at least one locating structure comprises a cut-out formed in the housing, and a projection formed on the magnet holder and engaged with the cut-out.

Preferably, the magnet holder further comprises a body, the locking structures extending from the body and being inserted into the housing.

Preferably, each locking structure comprises a wedge-shaped inner end inwardly abutting corresponding magnets to prevent the corresponding magnets from moving inwardly.

Preferably, a flux ring is installed between the magnets and the housing.

Preferably, a second magnet holder is disposed within the housing, the second magnet holder comprising a plurality of locking structures, and the other ends of the magnets are respectively locked between adjacent locking structures of the second magnet holder.

Preferably, the magnets are sandwiched between a retaining ring and the housing or flux ring.

Preferably, the retaining ring has a flange abutting against an end of the magnets.

Preferably, the magnet holder has a plurality of locking recesses and the retaining ring has a plurality of fingers crimped into corresponding locking recesses of the magnet holder.

Alternatively, plastic material is injected into the space between the retaining ring and the flux ring to fix the magnets and retaining ring to the flux ring.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
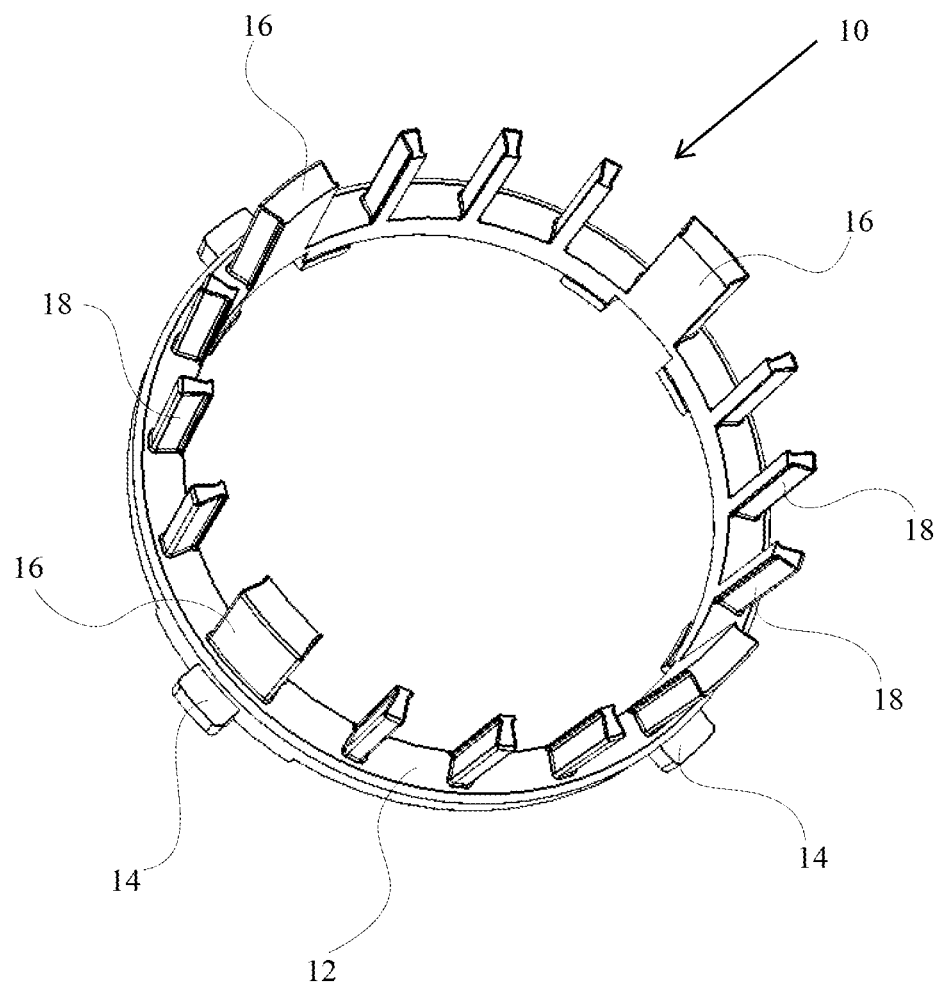
FIG. 1 is a perspective view of a magnet holder according to a first embodiment of the present invention.

Referring to FIG. 1, a magnet holder 10 in accordance with a preferred embodiment of the present invention comprises an annular body 12, a plurality of locating projections 14, locking blocks 16 and locking ribs 18. The annular body 12 comprises a first end surface (upper surface in FIG. 1), a second end surface (lower surface in FIG. 1) opposite to the first end surface, and a pair of circumferential surfaces respectively connecting inner and outer edges of the first and second end surfaces. The locking blocks 16 and the locking ribs 18 are arranged on the first end surface of the body 12. In this embodiment, the magnet holder 10 comprises four locking blocks 16 evenly distributed in the circumferential direction of the annular body 12. Three locking ribs 18 are evenly distributed between each pair of adjacent blocks 16. Preferably, each block 16 and rib 18 extends perpendicularly from the first end surface of the annular body 12.

Figure 2:
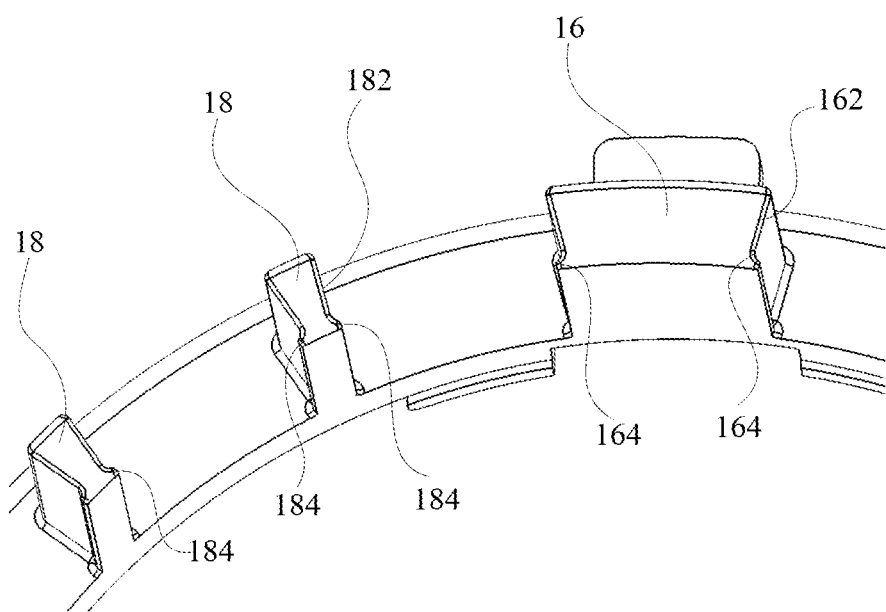
FIG. 2 is an enlarged partial view of the magnet holder of FIG. 1.

Referring to FIG. 2, the ribs 18 have the same height as the blocks 16 in the axial direction of the body 12 and less width than the blocks 16 in the circumferential direction of the body 12. Each block/rib 16/18 has a pair of concave locking side surfaces 162/182 on opposite sides in a circumferential direction of the body 12. Each block/rib 16/18 has a wedge inner end 164/184. The width of the block/rib 16/18 reduces gradually in the radial direction of the body 12 from the radial outer end toward the radial inner end while the width of inner end 164/184 increases gradually in the radial direction towards the center of the body 12.

Figure 3:
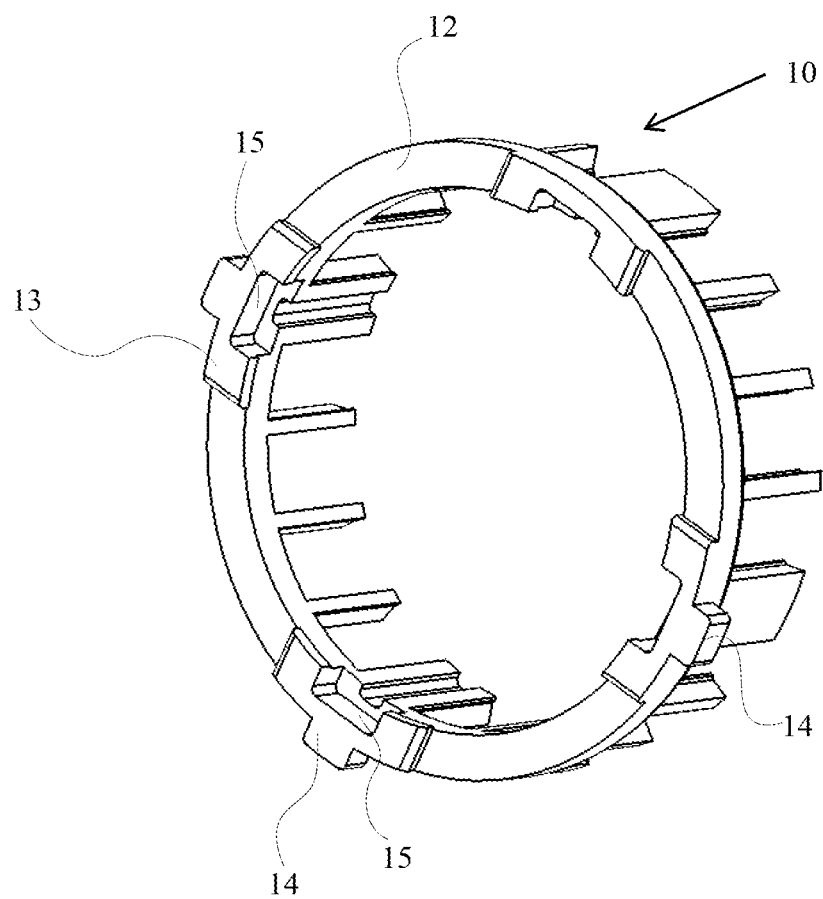
FIG. 3 illustrates a slight modification of the magnet holder of FIG. 1 viewed from another aspect.
Figure 8:
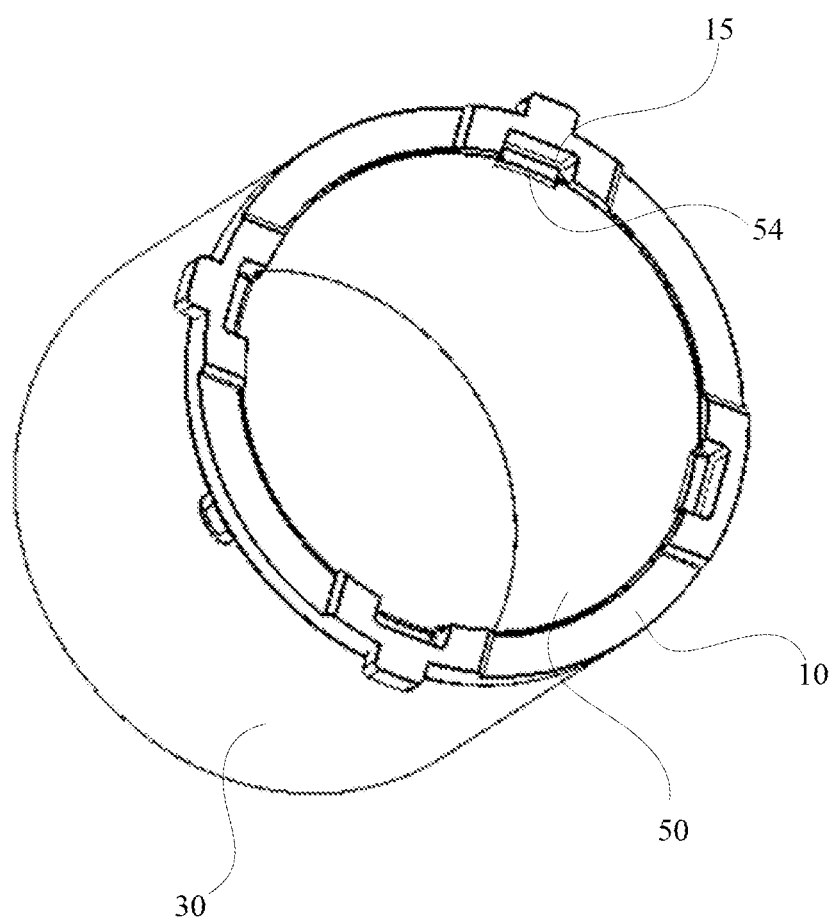
FIG. 8 illustrates the assembly of FIG. 7B, viewed from a different angle.

Magnet holder 10 is shown in FIG. 3 from the other side to reveal four locating protrusions 13 formed at the second end surfaces of the body 12 and three locating projections 14 respectively extending radially outwardly from three of the four locating protrusions. FIG. 3 also illustrates optional locating recess 15 formed in the inner surface of locating protrusions 13 and joining with optional grooves formed in the locking blocks 16. The locating projections 14 and the recesses 15 cooperatively form a locating structure for locating the ring magnet holder 10 to a round motor housing 90 (shown in FIGS. 8, 10 and 11). Understandably, when the body 12 has a non-circle shape, the locating projections 14 and recesses 15 may be omitted.

Preferably, the magnet holder 10 is integrally made of plastic via molding to form a monolithic structure.

Figure 4:
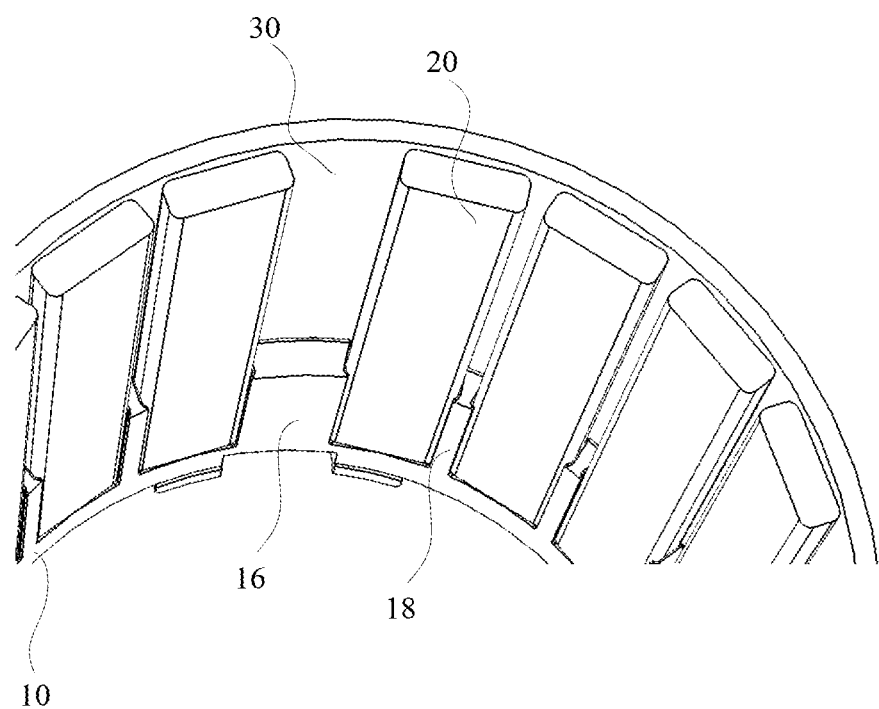
FIG. 4 illustrates a portion of an assembly of the magnet holder, magnets and a flux ring.

FIG. 4 illustrates a portion of an assembly of the magnet holder 10, magnets 20 and a flux ring 30. During assembly, the magnet holder 10 is pressed into the flux ring 30 from one open end of the flux ring 30 until the first end surface of the body 12 of magnet holder 10 contacts with the end surface of the flux ring 30. The blocks 16 and ribs 18 are inserted into the open end of the flux ring 30. The magnets 20 are then pressed into the flux ring 30 from the other open end of the flux ring 30 until the magnets 20 contact with the first end surface of the body 12 of the magnet holder 10. Each magnet 20 is locked between a pair of adjacent locking surfaces of the blocks/ribs 16/18. In this embodiment, the magnets 20 are elongate plate-shaped magnets. Each magnet 20 comprises a pair of opposite major surfaces parallel to each other and a pair of side surfaces respectively connecting sides of the major surfaces. The major surfaces of the magnet 20 are perpendicular to a radial direction of the stator. The side surfaces of the magnet 20 conform to the corresponding side surfaces of the ribs 18 or blocks 16. The wedge inner ends 164 and 184 of the blocks 16 and ribs 18 abut against inner edges of the magnets 20 to thereby prevent the magnet 20 moving inwardly. There are four magnets 20 located between each pair of adjacent blocks 16 and the four magnets 20 located between adjacent blocks 16 have the same polarity to cooperatively form a magnetic pole. Adjacent magnetic poles have opposite polarities. In this embodiment, each magnetic pole is comprised of multiple elongate plate shaped magnets, which reduces eddy current losses in the magnets.

Figure 5A:
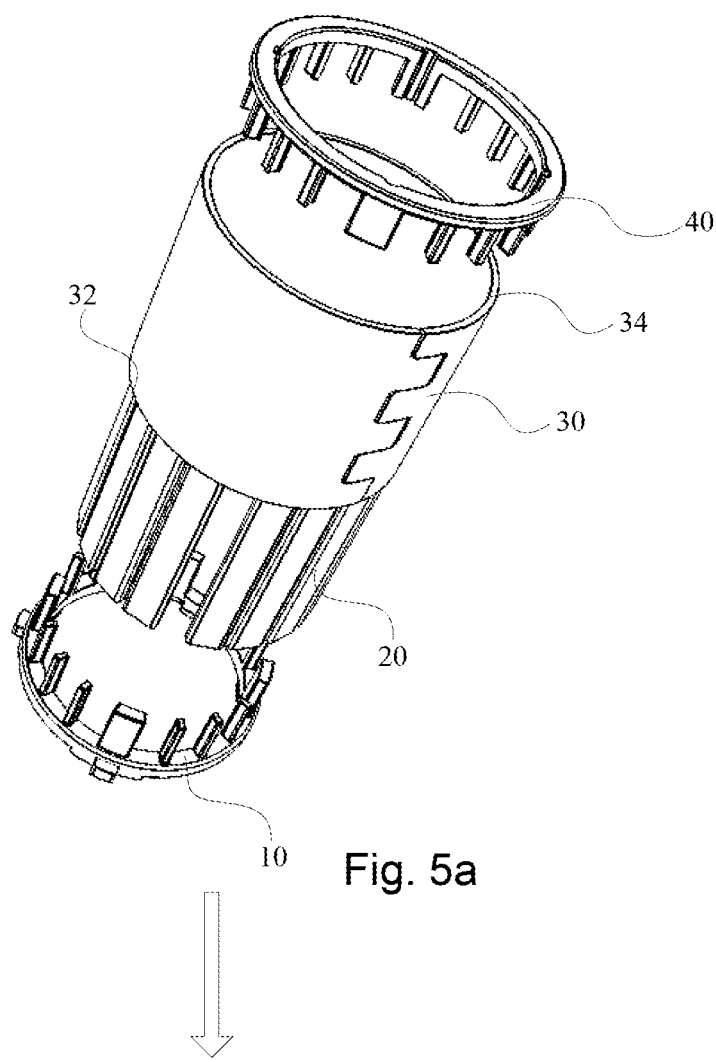
FIG. 5A is an exploded view of a flux ring, magnets and magnet holders in accordance with a second embodiment of the present invention.
Figure 5B:
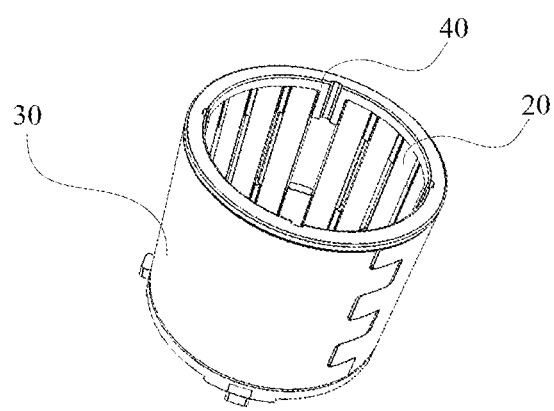
FIG. 5B is an assembled view of the parts of FIG. 5A.
Figure 6:
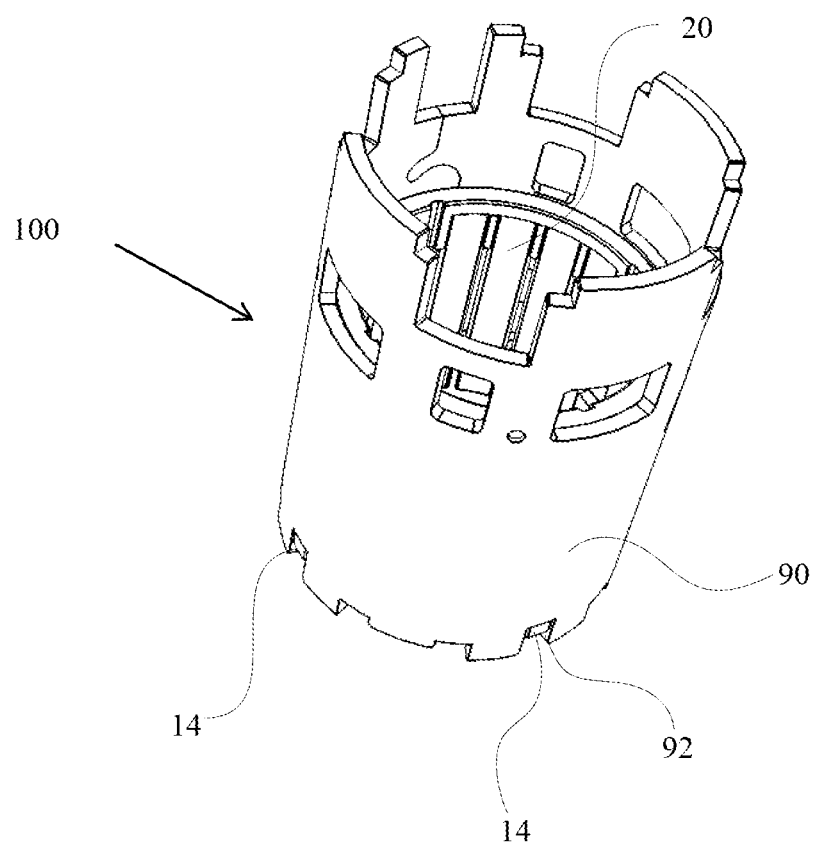
FIG. 6 illustrates the assembled flux ring, magnets and magnet holders of FIG. 5B, installed within a stator housing.
Figure 7A:
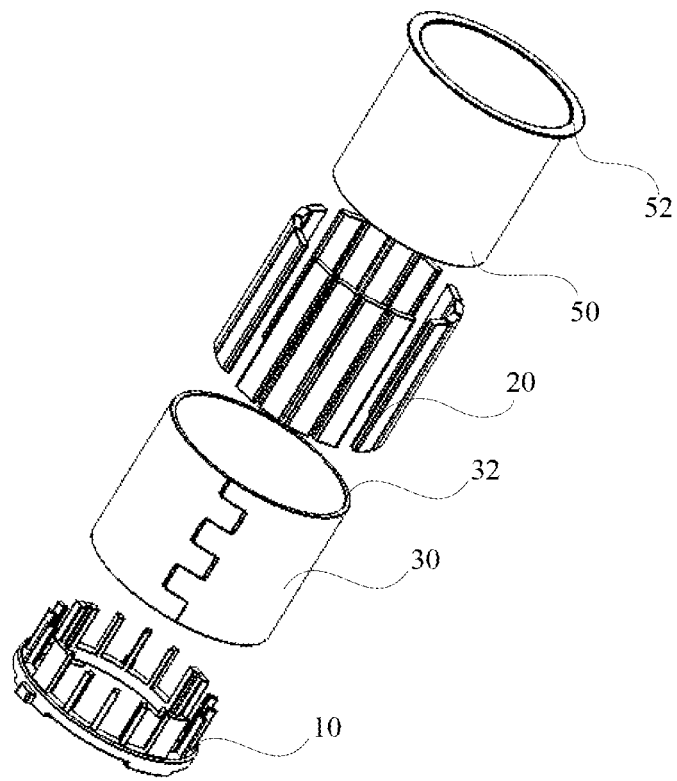
FIG. 7A is an exploded view of a flux ring, magnets and magnet holders in accordance with a third embodiment of the present invention.
Figure 7B:
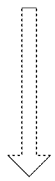
FIG. 7B is an assembled view of the parts of FIG. 7A.
Figure 7B:
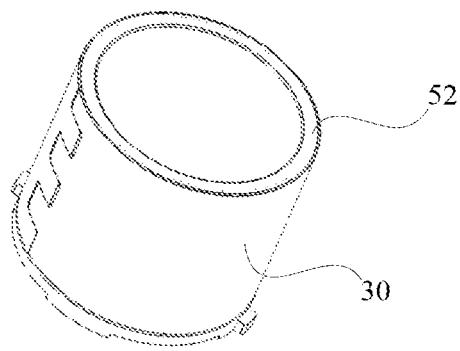

FIGS. 5A, 5B and FIG. 6 illustrate a stator in accordance with a second embodiment of the present invention. The stator 100 comprises a pair of magnet holders 10, 40 which are press fitted into opposite open ends 32, 34 of the flux ring 30. Opposite axial end surfaces of the flux ring 30 respectively contact with the first end surfaces 12 of the magnet holders 10, 40 and outer surfaces of the blocks 16 and ribs 18 firmly contact with the inner surface of the flux ring 30. The magnet holder 40 has a structure similar to the magnet holder 10 except that the magnet holder 40 has no locating projections formed on the outer circumferential surface of the annular body. Opposite axial ends of each magnet 20 are locked between adjacent ribs 18 or between adjacent block 16 and rib 18 of the magnet holders 10, 40. The combined magnet holders 10, 40, magnets 20 and flux ring 30 are inserted into a stator housing 90. The stator housing 90 has a cylindrical configuration with open axial ends. One end of the stator housing 90 defines a plurality of cutouts 92 for receiving the locating projections 14 of the magnet holder 10 to thereby circumferentially locate the magnets with the housing and to prevent the magnet holder 10 from moving relative to the stator housing 90 in axial and circumferential directions of the stator. An end cap (not shown) may be attached to the end of the stator housing 90 to prevent the combined magnet holders 10, 40, magnets 20 and flux ring 30 from withdrawing from the stator housing 90.

Figure 9:
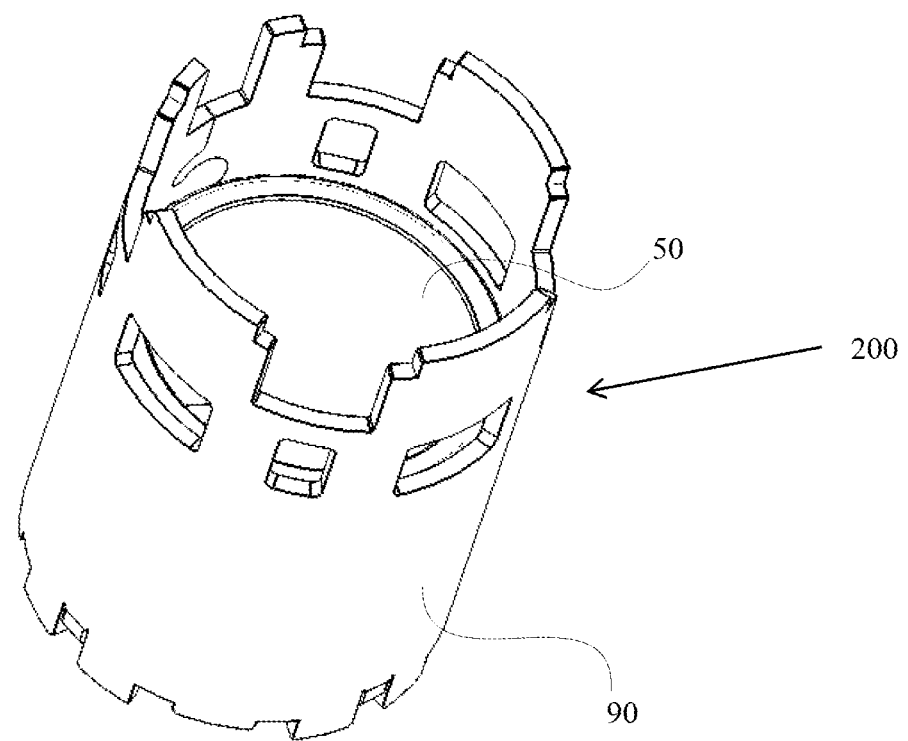
FIG. 9 illustrates the assembly of FIG. 8, installed in a stator housing.

FIG. 7A to FIG. 9 illustrate a stator 200 in accordance with a third embodiment of the present invention. The stator 200 comprises a magnet holder 10, a plurality of magnets 20, a flux ring 30, a retaining ring 50 and a stator housing 90. The magnet holder 10 is pressed into one end of the flux ring 30. The magnets 20 are inserted into the flux ring 30 from the other end of the flux ring 30. One axial end of each magnet 20 is located between adjacent ribs 16 or between adjacent rib and block 18. The retaining ring 50 has a flange 52 extending outwardly from one end thereof. The retaining ring 50 is inserted into the flux ring 30 from the other end thereof until the flange 52 contacts with the other end of the flux ring 30. The outer circumferential surface of the ring 50 presses the magnets 20 outwardly to thereby firmly sandwich the magnets 20 between the retaining ring 50 and the flux ring 30. The retaining ring 50 may be made of non-magnetically conductive material such as stainless steel. Preferably, the retaining ring 50 has the same height as the magnets 20. The retaining ring 50 has fingers 54 formed at the other end thereof away from the flange 52. After the retaining ring 50 is inserted into the flux ring 30, the fingers 54 are pressed outwardly to be crimped into the corresponding locating recesses 15 of the magnet holder 10 to thereby locate the retaining ring 50 relative to the magnet holder 10 in axial and circumferential directions. The combined magnet holders 10, 40, magnets 20 and flux ring 30 are inserted into a stator housing 90, as shown in FIG. 9 to complete the stator. End caps, brush gear and a wound rotor complete the motor.

Figure 10A:
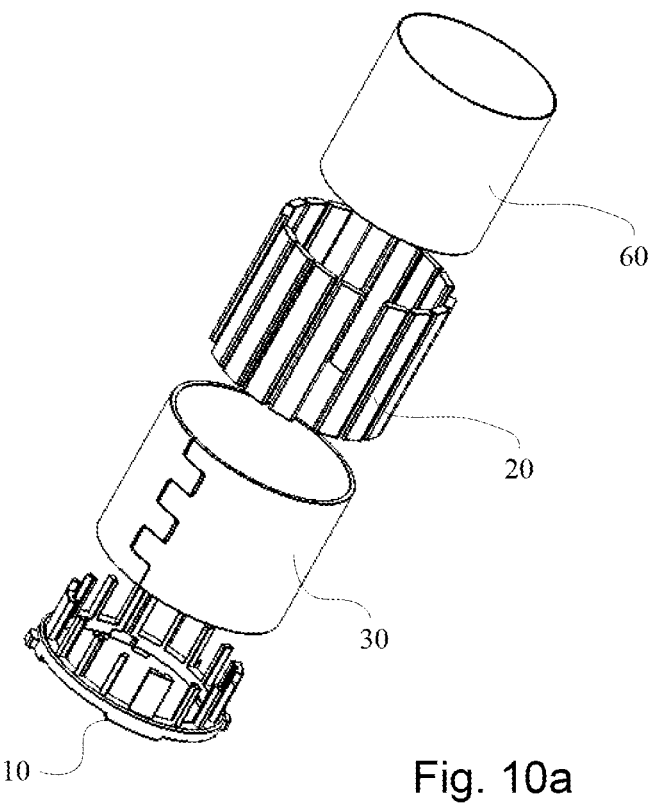
FIG. 10A is an exploded view of a flux ring, magnets and magnet holders in accordance with a fourth embodiment of the present invention.
Figure 10B:
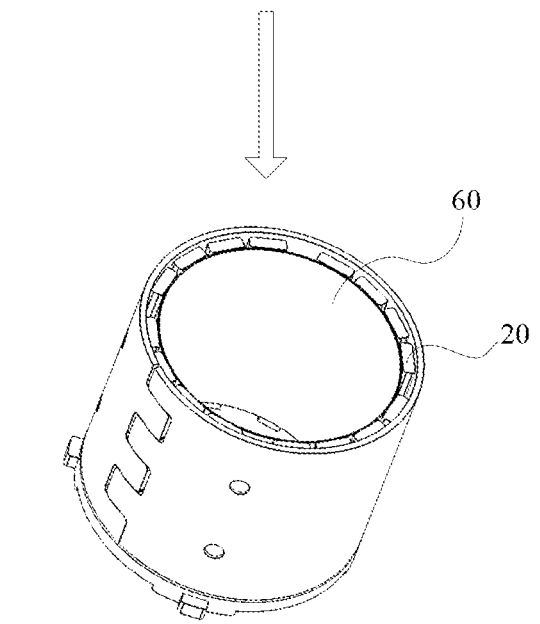
FIG. 10B is an assembled view of the parts of FIG. 10A.
Figure 11:
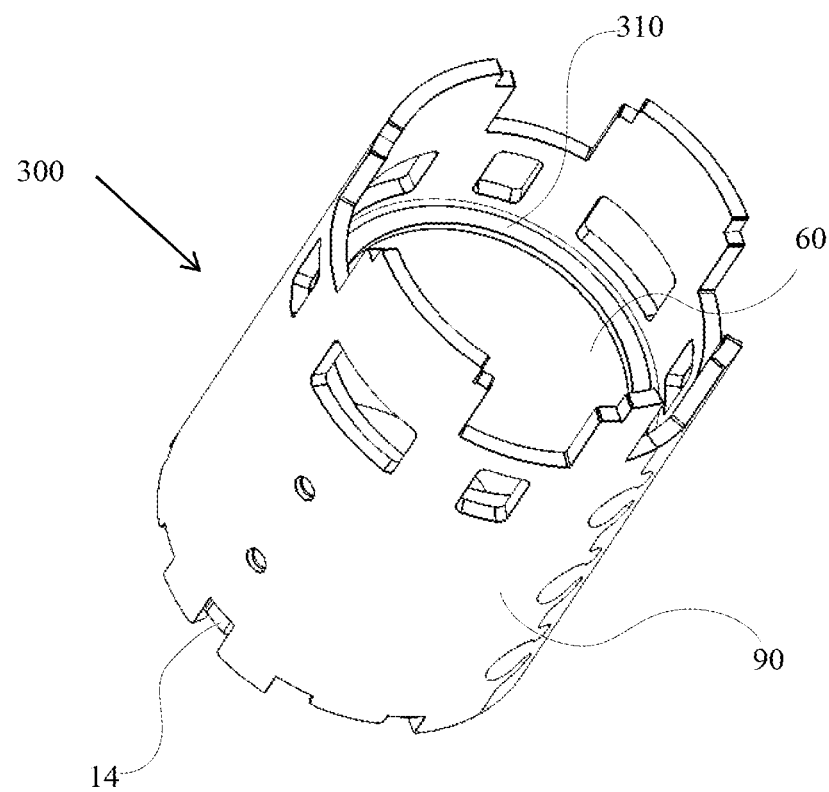
FIG. 11 illustrates the assembled flux ring, magnets and magnet holders of FIG. 10B installed in a stator housing.

FIG. 10A to FIG. 11 illustrate a stator 300 in accordance with a fourth embodiment of the present invention. The stator 300 comprises a magnet holder 10, a plurality of magnets 20, a flux ring 30, a retaining ring 60 and a stator housing 90. The retaining ring 60 is similar to the retaining ring 50 except that the retaining ring 60 has no flange formed at an end thereof. After the combined magnet holder 10, magnets 20, flux ring 30 and retaining ring 60 are inserted into the stator housing 90 from one end of the stator housing 90, plastic material 310 is injected into the space formed between the retaining ring 60 and flux ring 30 from the other end of the stator housing 90. The magnets 20, flux ring 30 and retaining ring 60 are therefore fixed to the inner surface of the stator housing 90 via the plastic material 310.

Figure 12:
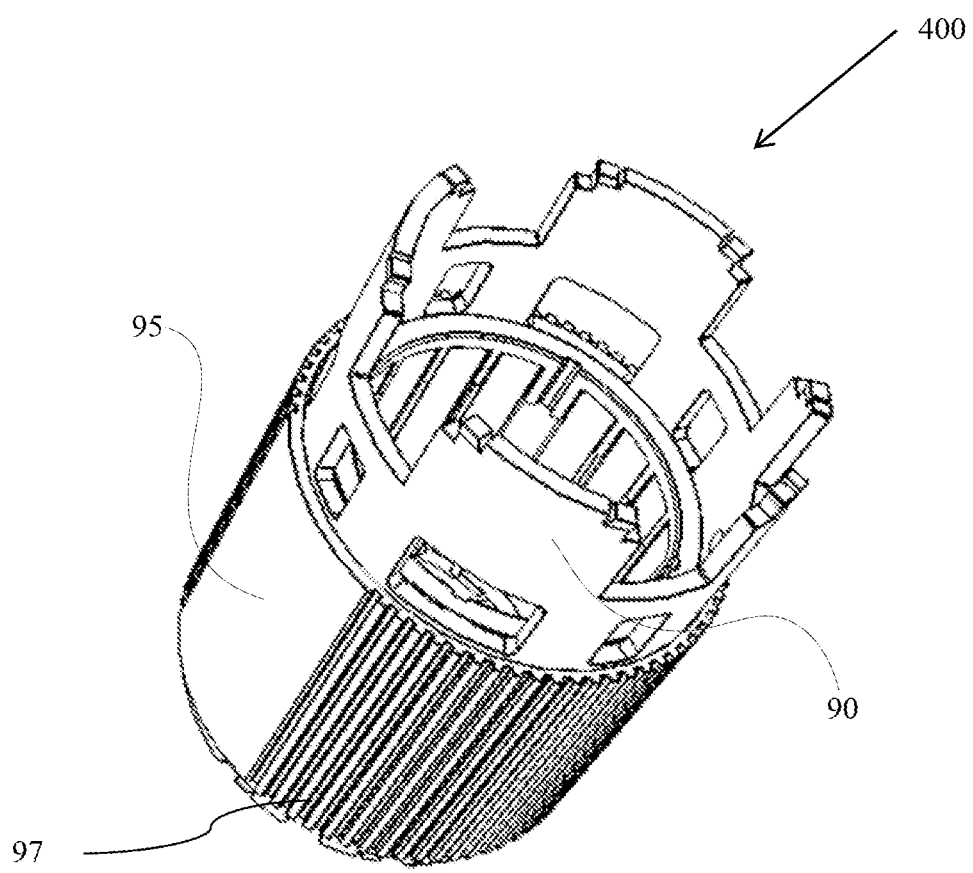
FIG. 12 illustrates a stator in accordance with a fifth embodiment of the present invention.

FIG. 12 illustrates a stator 400 in accordance with a fifth embodiment of the present invention. In this embodiment, the stator 400 is similar to the stator 100 except that the stator 400 comprises a cylindrical heat dissipation device 95 attached on the stator housing 90. The heat dissipation device 95 comprises a plurality of fins 97 for increasing heat dissipation surface area of the heat dissipation device 95.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. For example, each magnetic pole may be made of one magnet and locking ribs 16 may be omitted. The flux ring 30 may be omitted when the stator housing 90 has enough thickness. Therefore, the scope of the invention is to be determined by reference to the claims that follow.

The invention claimed is:

1. A stator for an electric motor, comprising:
a housing made of magnetically conductive material;
a plurality of magnets fixed to the housing;
a magnet holder attached to one end of the housing for fixing the magnets to the housing, the magnet holder comprising a plurality of locking structures, each magnet being locked between two adjacent locking structures; and
at least one locating structure formed between the magnet holder and the stator housing for locating the magnet holder relative to the stator housing; and the at least one locating structure comprising a cut-out formed in the housing and a projection formed on the magnet holder and engaged with the cut-out.

2. The stator of claim 1, wherein each locking structure has a pair of concave locking surfaces formed on opposite sides thereof, and each magnet has a pair of side surfaces conforming with corresponding locking surfaces of the magnet holder.

3. The stator of claim 2, wherein the magnets are arranged in groups of like polarities to form magnetic poles of the stator.

4. The stator of claim 3, wherein widths of the locking structures located between adjacent magnets with the same polarities are less than widths of the locking structures located between adjacent magnets with opposite polarities.

5. The stator of claim 1, wherein the magnets are elongate plate shaped magnets.

6. The stator of claim 5, wherein each magnet has a pair of opposite major surfaces parallel to each other, the major surfaces being perpendicular to a radial direction of the stator.

7. The stator of claim 1, wherein the magnet holder further comprises a body axially abutting against the one end of the housing, the locking structures extending from the body and being inserted into the stator housing.

8. The stator of claim 1, wherein each locking structure comprises a wedge-shaped inner end inwardly abutting corresponding magnets to prevent the corresponding magnets from moving inwardly.

9. The stator of claim 1, further comprising a second magnet holder disposed within the housing, said second magnet holder comprising a plurality of locking structures, and the other end of each magnet is locked between adjacent locking structures of the second magnet holder.

10. The stator of claim 1 further comprising a flux ring installed between the magnets and the stator housing.

11. The stator of claim 10, further comprising a retaining ring, wherein the magnets are sandwiched between the retaining ring and the flux ring.

12. The stator of claim 11, wherein the retaining ring has a flange abutting against an end of the magnets.

13. The stator of claim 11, wherein the magnet holder has a plurality of locking recesses and the retaining ring has a plurality of fingers crimped into corresponding locking recesses of the magnet holder.

14. The stator of claim 11, wherein plastic material is disposed between the retaining ring and the flux ring to fix the magnets and retaining ring to the flux ring.

15. An electric motor incorporating the stator of claim 1.

16. A stator for an electric motor, comprising:
a housing made of magnetically conductive material;
a plurality of magnets fixed to the housing;
a magnet holder attached to one end of the housing for fixing the magnets to the housing, the magnet holder comprising a plurality of locking structures, each magnet being locked between two adjacent locking structures;
a flux ring installed between the magnets and the stator housing; and
a retaining ring, the magnets sandwiched between the retaining ring and the flux ring.

17. The stator of claim 16, wherein the retaining ring has a flange abutting against an end of the magnets.

18. The stator of claim 16, wherein the magnet holder has a plurality of locking recesses and the retaining ring has a plurality of fingers crimped into corresponding locking recesses of the magnet holder.

19. The stator of claim 16, wherein plastic material is disposed between the retaining ring and the flux ring to fix the magnets and retaining ring to the flux ring.

* * * * *